(12) United States Patent
Tanaka et al.

(10) Patent No.: US 11,460,758 B2
(45) Date of Patent: Oct. 4, 2022

(54) PROJECTOR

(71) Applicant: SEIKO EPSON CORPORATION, Tokyo (JP)

(72) Inventors: Masatoshi Tanaka, Azumino (JP); Takuya Hatano, Suwa (JP); Nobuyuki Otsuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/361,461

(22) Filed: Jun. 29, 2021

(65) Prior Publication Data
US 2022/0004088 A1 Jan. 6, 2022

(30) Foreign Application Priority Data
Jul. 2, 2020 (JP) .............................. JP2020-114682

(51) Int. Cl.
*G03B 21/14* (2006.01)
*G03B 21/20* (2006.01)
*G03B 21/16* (2006.01)

(52) U.S. Cl.
CPC ........... *G03B 21/145* (2013.01); *G03B 21/16* (2013.01); *G03B 21/208* (2013.01)

(58) Field of Classification Search
CPC ..... G03B 21/14; G03B 21/145; G03B 21/208
USPC ......................................................... 353/15
See application file for complete search history.

(56) References Cited

U.S. PATENT DOCUMENTS

| 6,203,158 | B1 | 3/2001 | Furuhata et al. | |
|---|---|---|---|---|
| 7,445,343 | B2* | 11/2008 | Solomon | G03B 21/145 353/15 |
| 7,559,659 | B2* | 7/2009 | Rhodes | G03B 21/26 348/789 |
| 8,794,771 | B2* | 8/2014 | Kimura | G03B 21/22 353/122 |
| 9,841,661 | B2* | 12/2017 | Hsu | G03B 21/14 |
| 2002/0109822 | A1 | 8/2002 | Matsuda et al. | |
| 2006/0044513 | A1 | 3/2006 | Sakurai | |
| 2006/0227291 | A1* | 10/2006 | Johnson | G11B 33/025 353/15 |

FOREIGN PATENT DOCUMENTS

| JP | 03598763 B | 7/1998 |
|---|---|---|
| JP | 2002-214709 A | 7/2002 |
| JP | 2006-50167 A | 2/2006 |

(Continued)

*Primary Examiner* — William C. Dowling
(74) *Attorney, Agent, or Firm* — Dority & Manning, P.A.

(57) ABSTRACT

A projector according to the present disclosure includes a projection optical unit section including a projection lens, a speaker section, and a chassis having a first holding part configured to hold the projection optical unit section, and a second holding part which is stacked along a first direction with respect to the first holding part, and is configured to hold the speaker section, wherein light emitted from the projection lens spreads toward a second direction perpendicular to the first direction in a plane including the first direction and an optical axis of the projection lens, and in the light emitted from the projection lens, a divergence angle at an opposite side to the first direction with respect to the second direction is smaller than a divergence angle at the first direction side with respect to the second direction.

10 Claims, 4 Drawing Sheets

(56) References Cited

FOREIGN PATENT DOCUMENTS

| JP | 2006-072037 A | 3/2006 |
| JP | 2006-284893 A | 10/2006 |
| JP | 2009-229617 A | 10/2009 |
| JP | 2011-22225 A | 10/2009 |
| JP | 2015-040974 A | 3/2015 |

\* cited by examiner

PROJECTOR

The present application is based on, and claims priority from JP Application Serial Number 2020-114682, filed Jul. 2, 2020, the disclosure of which is hereby incorporated by reference herein in its entirety.

BACKGROUND

1. Technical Field

The present disclosure relates to a projector.

2. Related Art

In the past, there has been a projector having a speaker and a projector main body arranged so as to vertically be stacked in a cabinet (see e.g., JP-A-2006-50167).

In the projector described above, since the speaker is disposed at the lower side, there is a problem that the sound emitted from the speaker is reflected by an installation surface of the projector to thereby become indistinct, and thus, there is a possibility that the sound quality deteriorates, or the image quality of the projector is affected by a vibration of the speaker.

SUMMARY

In view of the problems described above, an aspect of the present disclosure provides a projector including a projection optical unit section including a projection lens, a speaker section, and a chassis having a first holding part configured to hold the projection optical unit section, and a second holding part which is stacked along a first direction with respect to the first holding part, and is configured to hold the speaker section, wherein light emitted from the projection lens of the projection optical unit section is different in divergence angle with respect to an optical axis of the projection lens in the first direction, and a divergence angle of a light flux at the first holding part side in the first direction is smaller than a divergence angle of a light flux at the second holding part side in the first direction.

DESCRIPTION OF AN EXEMPLARY EMBODIMENT

An embodiment of the present disclosure will hereinafter be described using the drawings.

A projector according to the present embodiment is an example of a projector using liquid crystal panels as light modulation devices.

It should be noted that in each of the drawings described below, the constituents are shown with the scale ratios of respective sizes set differently between the constituents in some cases in order to facilitate the visualization of each of the constituents.

Figure 1:
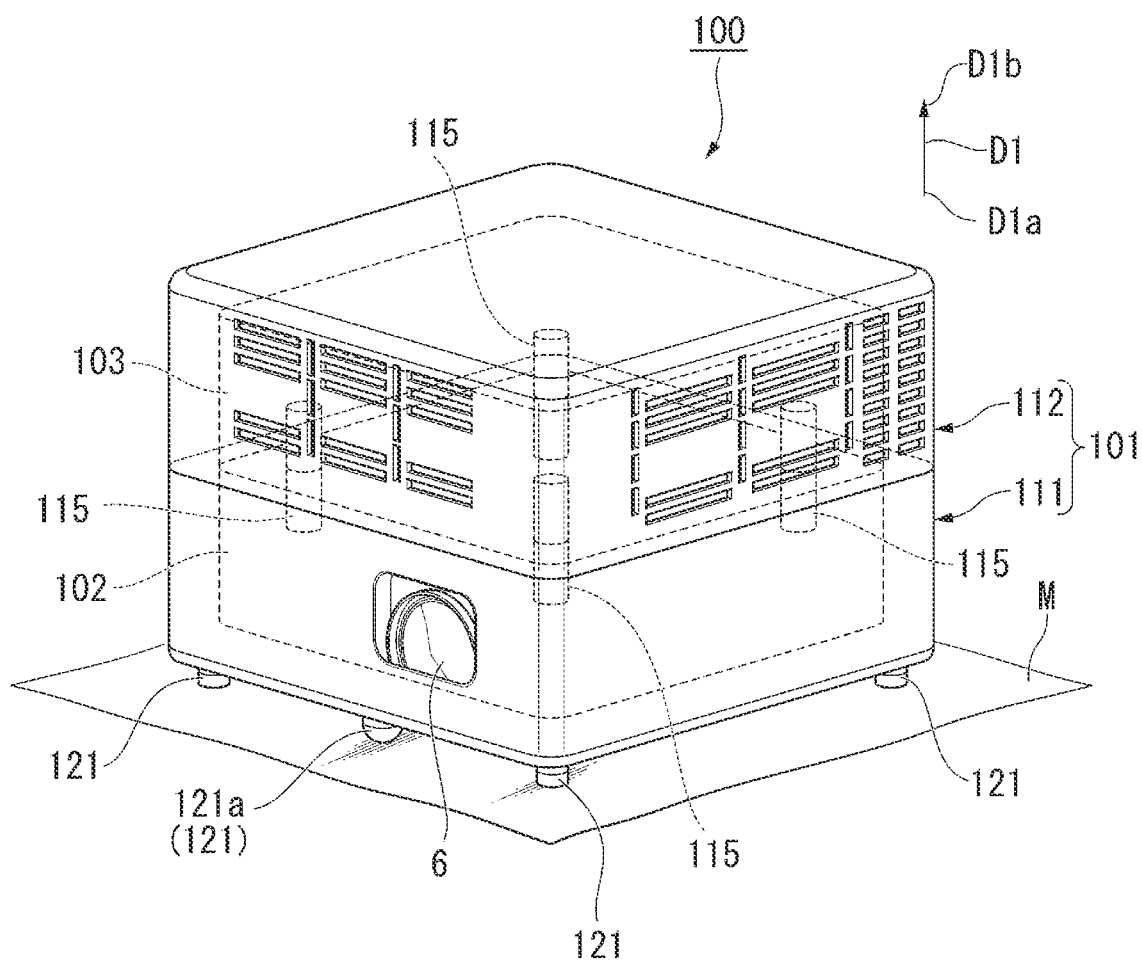
FIG. 1 is a diagram showing a schematic configuration of a projector according to an embodiment.

FIG. 1 is a diagram showing a schematic configuration of the projector according to the present embodiment.

As shown in FIG. 1, the projector 100 according to the present embodiment is provided with a chassis 101 having a rectangular solid shape, a projection optical unit section 102 including a projection lens, and a speaker section 103. The chassis 101 has a first holding part 111 for holding the projection optical unit section 102, the second holding part 112 for holding the speaker section 103, and a cooling section 104 for cooling the projection optical unit section 102.

The projector 100 according to the present embodiment is used in a state of being mounted on an installation surface M such as a table. It should be noted that the installation surface M is not limited to a horizontal surface, but can be a surface tilted with respect to the horizontal surface. The chassis 101 has a structure having the first holding part 111 and the second holding part 112 stacked on one another along a height direction (first direction) D1 of the projector 100 perpendicular to the installation surface M. In other words, the chassis 101 in the present embodiment has a two-tiered structure which holds the projection optical unit section 102 at an opposite side D1a to the height direction D1 of the projector 100, and holds the speaker section 103 at an upper side D1b in the height direction of the projector 100. In the present embodiment, the height direction D1 means a direction along a normal line of the installation surface M.

In the chassis 101 in the present embodiment, the first holding part 111 and the second holding part 112 are formed of discrete bodies. The first holding part 111 and the second holding part 112 are fixed to each other with a fixation structure section 115. The fixation structure section 115 is disposed inside the chassis 101. According to this configuration, since screw members constituting the fixation structure section 115 are not exposed to an exterior part of the chassis 101, it is possible to improve an appearance property of the projector 100. It should be noted that the first holding part 111 and the second holding part 112 can be integrated with each other.

The first holding part 111 has a bottom plate 120, and a plurality of leg parts 121 provided to the bottom plate 120. The bottom plate 120 closes a housing space for housing the projection optical unit section 102. The plurality of leg parts 121 has contact with the installation surface M to thereby support the projector 100 in a stable state.

In the present embodiment, the plurality of leg parts 121 includes a first leg part 121a located at a projection lens 6 side. The first leg part 121a can be adjusted in an amount of projection from the bottom plate 120. Thus, a direction of light emitted from the projection lens 6 of the projector 100 according to the present embodiment can be moved obliquely upward with respect to the installation surface M by adjusting the amount of projection of the first leg part 121a from the bottom plate 120.

Figure 2:
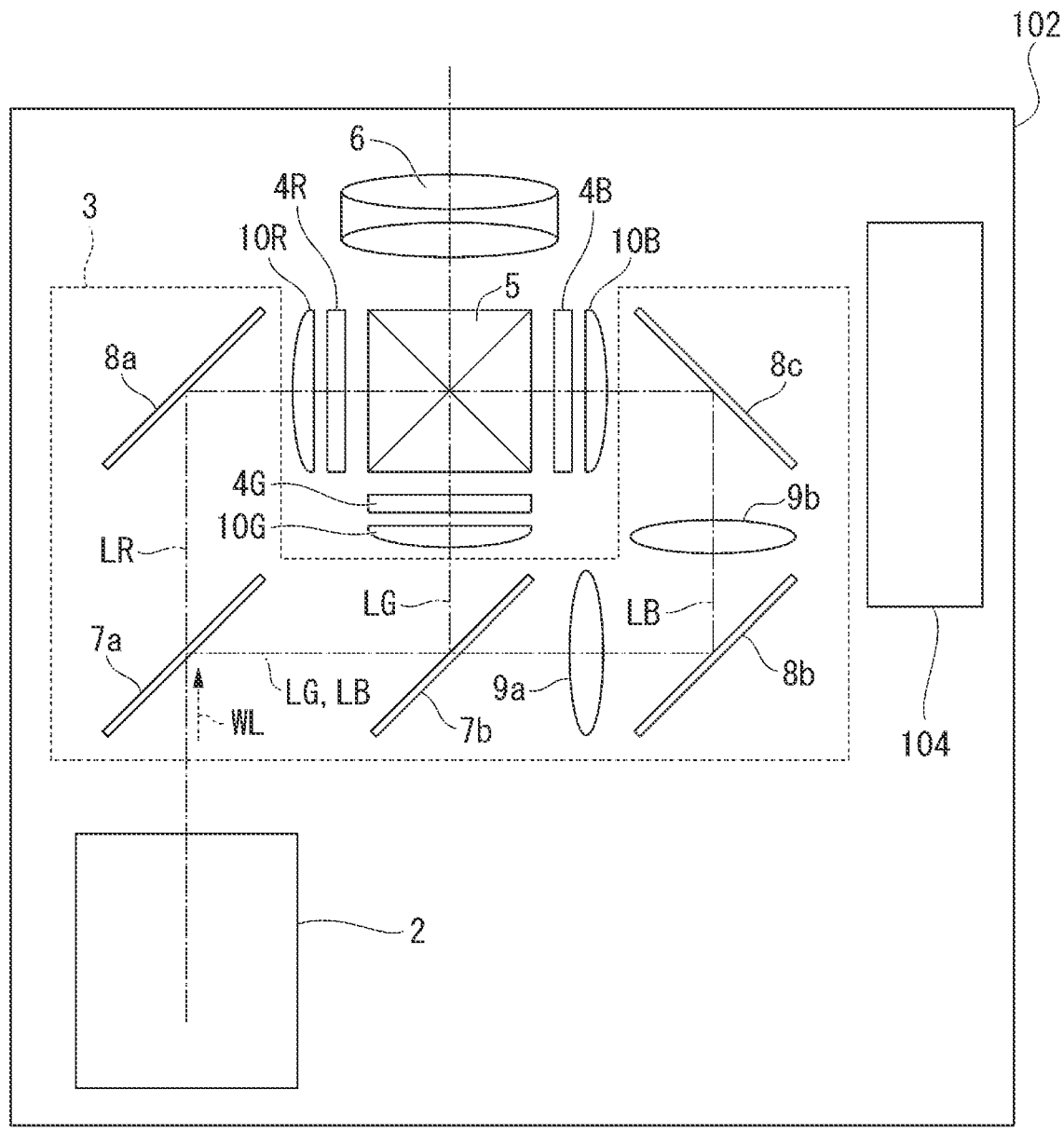
FIG. 2 is a diagram showing a configuration of a projection optical unit section.

FIG. 2 is a diagram showing a configuration of the projection optical unit section 102.

As shown in FIG. 2, the projection optical unit section 102 is provided with a light source device 2, a color separation optical system 3, a light modulation device 4R, a light modulation device 4G, a light modulation device 4B, a combining optical system 5, and the projection lens 6.

Further, inside the chassis 101, there is disposed the cooling section 104 for supplying a cooling medium to the light source device 2, the light modulation device 4R, the light modulation device 4G, and the light modulation device 4B.

The light source device 2 emits illumination light WL having a white color toward the color separation optical system 3. The color separation optical system 3 separates the illumination light WL having a white color into red light LR, green light LG, and blue light LB. The color separation optical system 3 is provided with a first dichroic mirror 7a, a second dichroic mirror 7b, a first reflecting mirror 8a, a second reflecting mirror 8b, a third reflecting mirror 8c, a first relay lens 9a, and a second relay lens 9b.

The first dichroic mirror 7a separates the illumination light WL from the light source device 2 into the red light LR and the other light (the green light LG and the blue light LB). The first dichroic mirror 7a transmits the red light LR thus separated from, and at the same time reflects the other light (the green light LG and the blue light LB). Meanwhile, the second dichroic mirror 7b separates the other light into the green light LG and the blue light LB. The second dichroic mirror 7b reflects the green light LG thus separated from, and transmits the blue light LB.

The first reflecting mirror 8a is disposed in the light path of the red light LR, and the red light LR which has been transmitted through the first dichroic mirror 7a is reflected by the first reflecting mirror 8a toward the light modulation device 4R. Meanwhile, the second reflecting mirror 8b and the third reflecting mirror 8c are disposed in the light path of the blue light LB, and the blue light LB which has been transmitted through the second dichroic mirror 7b is reflected by the second reflecting mirror 8b and the third reflecting mirror 8c toward the light modulation device 4B. Further, the green light LG is reflected by the second dichroic mirror 7b toward the light modulation device 4G.

The first relay lens 9a and the second relay lens 9b are disposed at the light exit side of the second dichroic mirror 7b in the light path of the blue light LB. The first relay lens 9a and the second relay lens 9b correct a difference in illuminance distribution of the blue light LB due to the fact that the blue light LB is longer in optical path length than the red light LR and the green light LG.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As the light modulation device 4R, the light modulation device 4G, and the light modulation device 4B, there are used, for example, transmissive liquid crystal panels. Further, at the incident side and the exit side of the liquid crystal panel, there are disposed polarization plates (not shown), respectively, and thus, there is formed a configuration of transmitting only the linearly polarized light with a specific direction.

At the incident side of the light modulation device 4R, the light modulation device 4G, and the light modulation device 4B, there are disposed a field lens 10R, a field lens 10G, and a field lens 10B, respectively. The field lens 10R, the field lens 10G, and the field lens 10B collimate principal rays of the red light LR, the green light LG, and the blue light LB which enter the light modulation device 4R, the light modulation device 4G, and the light modulation device 4B, respectively.

The combining optical system 5 combines the image light corresponding to the red light LR, the image light corresponding to the green light LG, and the image light corresponding to the blue light LB with each other in response to incidence of the image light respectively emitted from the light modulation device 4R, the light modulation device 4G, and the light modulation device 4B, and then emits the image light thus combined toward the projection lens 6. As the combining optical system 5, there is used, for example, a cross dichroic prism. The projection lens 6 projects the image light having been combined by the combining optical system 5 toward a screen in an enlarged manner. The projection lens is formed by combining a plurality of lenses with each other.

The cooling section 104 has a fan for feeding the cooling medium. The cooling medium is, for example, air, and the fan is, for example, a sirocco fan or an axial fan.

Figure 3:
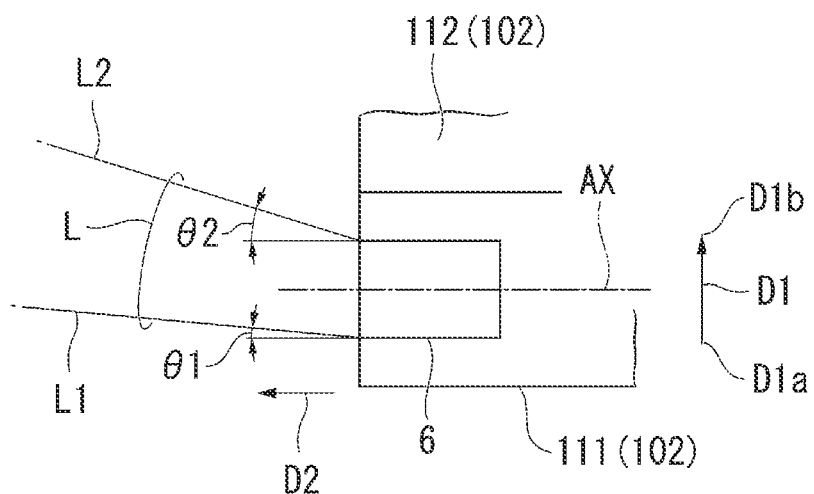
FIG. 3 is a diagram showing light emitted from the projection optical unit section toward a screen.

FIG. 3 is a diagram showing light emitted from the projection optical unit section 102 toward the screen. As shown in FIG. 3, the light L emitted from the projection lens 6 of the projection optical unit section 102 spreads toward a light emission direction (a second direction; a direction in which the light L is emitted) D2 perpendicular to the height direction D1 in a plane including the height direction D1 and an optical axis AX of the projection lens 6. The expression that the light L spreads toward the light emission direction D2 means that an area irradiated with the light L increases as getting away from the projection lens 6 along the light emission direction D2. In the present embodiment, the light emission direction D2 is a direction along the optical axis AX. It should be noted that FIG. 3 shows a cross-sectional view of the projection optical unit section 102 and the light L emitted from the projection lens 6 viewed from the normal direction of the plane including the optical axis AX and the height direction D1.

In the projector 100 according to the present embodiment, a divergence angle of a light flux L1 at the first holding part 111 side (at the opposite side D1a to the height direction D1) in the height direction D1, namely a divergence angle θ1 of the light L emitted toward the screen with respect to the light emission direction D2 at the opposite side D1a to the height direction D1, is smaller than a divergence angle of a light flux L2 at the second holding part 112 side (the opposite side D1a to the height direction D1) in the height direction D1, namely a divergence angle θ2 of the light L emitted toward the screen with respect to the light emission direction D2 at the height direction D1 side (the upper side D1b in the height direction) in a cross-sectional view viewed from the normal direction of the plane including the optical axis AX and the height direction D1.

In the present embodiment, the projection optical unit section 102 emits the light L so that the light flux L1 at the first holding part 111 side (the opposite side D1a) in the height direction D1 proceeds toward the optical axis AX. Further, the projection optical unit section 102 emits the light L so that the light flux L2 at the second holding part 112 side (the upper side D1b in the height direction) in the height direction D1 proceeds so as to gradually get away from the optical axis AX.

The light flux L1 defines an end at the opposite side D1a to the height direction D1 of the light L. The divergence angle θ1 with respect to the light emission direction D2 at the opposite side D1a to the height direction D1 of the light L means an angle formed between the proceeding direction of the light flux L1 and the light emission direction D2, and in other words, an angle formed between the end at the opposite side D1a to the height direction D1 of the light L and the light emission direction D2 in the cross-sectional view viewed from the normal direction of the plane including the optical axis AX and the height direction D1.

Further, the light flux L2 defines an end at the height direction D1 side of the light L. The divergence angle θ2 with respect to the light emission direction D2 at the height direction D1 side of the light L means an angle formed between the proceeding direction of the light flux L2 and the light emission direction D2, and in other words, an angle formed between the end at the height direction D1 side of the light L emitted toward the screen and the light emission direction D2 in the cross-sectional view viewed from the normal direction of the plane including the optical axis AX and the height direction D1.

The proceeding direction of the light L emitted from the projection optical unit section 102 can arbitrarily be adjusted by, for example, a configuration of the lenses constituting the projection lens 6 or a positional relationship between the projection lens 6 and the combining optical system 5.

Figure 4:
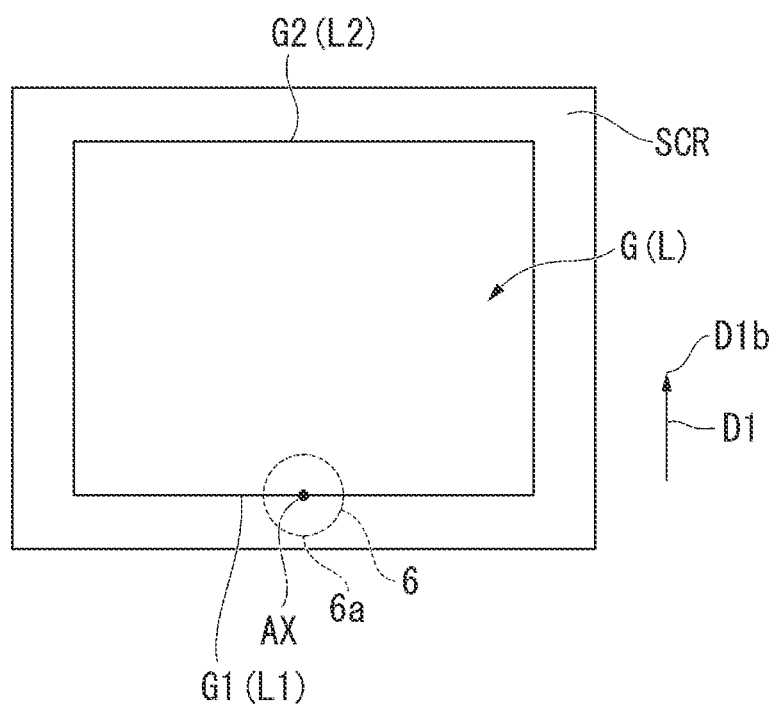
FIG. 4 is a diagram showing a positional relationship between a projection image and the projector.

FIG. 4 is a diagram showing a positional relationship between a projection image to be projected on the screen and the projector. FIG. 4 is a plan view of the screen SCR viewed from the back of the projector 100.

As shown in FIG. 4, in the projector 100 having the configuration described above, the light flux L1 of the light L emitted from the projection optical unit section 102 forms a lower end G1 of a projection image G projected on the screen SCR. Further, the light flux L2 of the light L emitted from the projection optical unit section 102 forms an upper end G2 of the projection image G projected on the screen SCR.

As shown in FIG. 3, the light flux L1 proceeds toward the optical axis AX. Therefore, a height line of the lower end G1 of the projection image G is located at an upper side of a height line of the lower end 6a of the projection lens 6 of the projector 100. In the present embodiment, as shown in FIG. 4, the lower end G1 of the projection image G is located at the height of the optical axis AX of the projection lens 6.

Figure 5A:
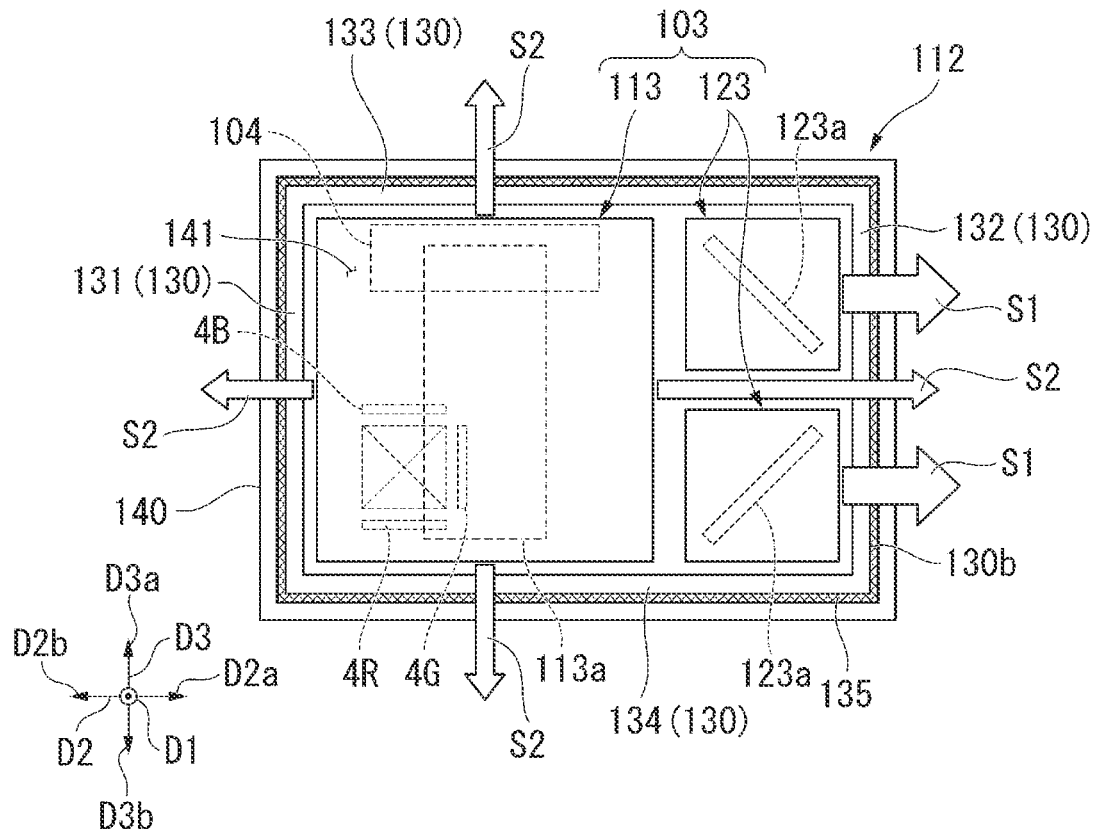
FIG. 5A is a top cross-sectional view of a second holding part.
Figure 5B:
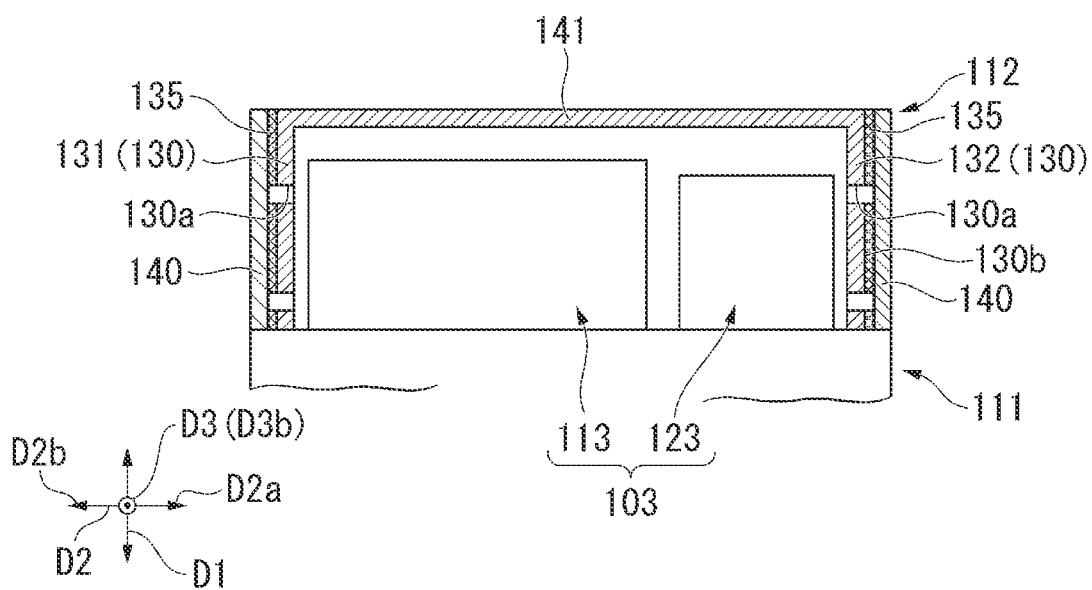
FIG. 5B is a side cross-sectional view of the second holding part.

FIG. 5A and FIG. 5B are each a diagram showing constituents of the second holding part 112. FIG. 5A corresponds to a top cross-sectional view of the second holding part 112, and FIG. 5B corresponds to a side cross-sectional view of the second holding part 112.

As shown in FIG. 5A and FIG. 5B, the second holding part 112 has a plurality of side plates 130 disposed so as to surround the periphery of the speaker section 103, a cover member 140, and a top plate 141.

The plurality of side plates 130 includes a first side plate 131, a second side plate 132, a third side plate 133, and a fourth side plate 134. The first side plate 131 is one of the side plates 130 and located at the front side in the light emission direction D2 from the projection optical unit section 102. The second side plate 132 is one of the side plates 130 and located at the rear side D2a in the light emission direction D2, and is disposed so as to be opposed to the first side plate 131. The third side plate 133 is one of the side plates 130 and located at one side D3a in a width direction D3 crossing the height direction D1 of the projection optical unit section 102 and the light emission direction D2. The fourth side plate 134 is one of the side plates 130 and located at the other side D3b in the width direction D3, and is disposed so as to be opposed to the third side plate 133.

As shown in FIG. 5B, the side plates 130 are each provided with a plurality of openings 130a. The cover member (a covering member) 140 is disposed so as to cover surfaces of the respective side plates 130. The side plates 130 are covered with the cover member 140, and thus, it becomes difficult to visually recognize the openings 130a from the outside. The cover member 140 is formed of, for example, mesh made of metal or cloth having a screen finer than the openings 130a. The top plate 141 is a plate member for closing the housing space of the speaker section 103 surrounded by the plurality of side plates 130. It should be noted that the cover member 140 and the side plates 130 can be disposed in a state of having contact with each other, or can be disposed with gaps.

Surfaces covered with the cover member 140 of the side plates 130 are each provided with an antireflection treatment. Specifically, a surface 130b of each of the side plates 130 is provided with an antireflection layer 135. The antireflection layer 135 is formed by, for example, grain finish or matte coating.

The speaker section 103 includes a low-tone range speaker (a first speaker) 113 and a middle/high-tone range speaker (a second speaker) 123. The low-tone range speaker 113 is a speaker for emitting a low-tone range sound. The middle/high-tone range speaker 123 is a speaker for emitting a middle/high-tone sound in a tone range higher than that of the low-tone range speaker 113. The sound in the middle/high-tone range emitted from the middle/high-tone range speaker 123 is high in directionality. It should be noted that the low-tone range speaker 113 and the middle/high-tone range speaker 123 are held integrally in the second holding part 112 with a chassis not shown.

The middle/high-tone range speaker 123 is disposed inside the second holding part 112 so as to face to an opposite direction to the light emission direction (the second direction) D2 of the projection optical unit section 102. Specifically, the middle/high-tone range speaker 123 is disposed inside the second holding part 112 so that a sounding surface thereof faces to the second side plate 132. The middle/high-tone range speaker 123 has a second vibrating plate 123a vibrating in a direction crossing the height direction D1, a side surface direction in the present embodiment. In a plan view viewed from the height direction D1, the second vibrating plate 123a is located at a position where the second vibrating plate 123a does not overlap the light modulation devices 4R, 4G, and 4B of the projection optical unit section 102.

When visually recognizing the projection image G of the projector 100, the user is located at the rear side D2a in the light emission direction D2 of the projector 100, namely a position facing the second side plate 132 of the second holding part 112. Therefore, the sound S1 in the middle/high-tone range emitted from the middle/high-tone range speaker 123 is made to efficiently reach the user via the openings 130a of the second side plate 132.

Meanwhile, the low-tone range speaker 113 is disposed at the front side D2b in the light emission direction D2 of the middle/high-tone range speaker 123 in the inside of the second holding part 112. The sound S2 in the low-tone range emitted from the low-tone range speaker 113 is low in directionality.

Therefore, in the projector 100 according to the present embodiment, the openings 130a are provided to each of the first side plate 131, the second side plate 132, the third side plate 133, and the fourth side plate 134 surrounding the periphery of the low-tone range speaker 113. Thus, the sound S2 in the low-tone range emitted from the low-tone range speaker 113 is emitted toward the all directions from each of the openings 130a of each of the side plates 130 surrounding the periphery of the low-tone range speaker 113, and is made to reach the ears of the user as a surround sound. The low-tone range speaker 113 has a first vibrating plate 113a vibrating in the height direction D1. In the plan view viewed from the height direction D1, the first vibrating plate 113a is disposed at a position where at least a part of the first vibrating plate 113a overlaps the cooling section 104.

As described above, in the projector 100 according to the present embodiment, there is provided the speaker section 103 in which the middle/high-tone range speaker 123 for emitting the sound S2 in the middle/high-tone range high in directionality is disposed at the user side, and the low-tone range speaker 113 for emitting the sound S1 in the low-tone range which is low in directionality and has a sneaking property is disposed at the opposite side to the middle/high-tone range speaker 123.

Advantages of Present Embodiment

The projector 100 according to the present embodiment is provided with the projection optical unit section 102 including the projection lens 6, the speaker section 103, the chassis 101 having the first holding part 111 for holding the projection optical unit section 102, and the second holding part 112 which is stacked on the first holding part 111 along the height direction D1 and holds the speaker section 103, the light L emitted from the projection lens 6 spreads toward the light emission direction D2 perpendicular to the height direction D1 in the plane including the height direction D1 and the optical axis AX of the projection lens 6, and in the light L emitted from the projection lens 6, the divergence angle θ1 at the opposite side D1a to the height direction D1 with respect to the light emission direction D2 is smaller than the divergence angle θ2 at the upper side D1b in the height direction with respect to the light emission direction D2.

Since the projector 100 according to the present embodiment has the structure having the projection optical unit section 102 and the speaker section 103 stacked in the height direction D1 on one another, when the user visually recognizes the projection image G on the screen SCR, there is a possibility that the second holding part 112 for holding the speaker section 103 enters the sight of the user to cause a blind area in the projection image G.

To cope with this point, in the projector 100 according to the present embodiment, since the divergence angle θ1 at the first holding part 111 side is made smaller than the divergence angle θ2 at the second holding part 112, it is possible to locate the height line of the lower end G1 of the projection image G projected on the screen SCR at the upper side of the height line of the lower end 6a of the projection lens 6 of the projector 100.

Thus, according to the projector 100 related to the present embodiment, it is possible to project the projection image G on the screen SCR in the state of being shifted toward the upper side D1b in the height direction. Therefore, it becomes difficult for the second holding part 112 located at the upper side D1b in the height direction to enter the sight of the user. Therefore, also in the projector 100 according to the present embodiment having the configuration of stacking the speaker section 103 on the projection optical unit section 102, it is possible to decrease the blind area caused in the projection image G.

Further, in the projector 100 according to the present embodiment, since there is adopted the structure of stacking the speaker section 103 on the projection optical unit section 102, the speaker section 103 is disposed at a distance from the installation surface M. Therefore, it is possible to make it difficult to cause such a problem that the sound emitted from the speaker section 103 is reflected by the installation surface M to thereby become indistinct.

As described above, according to the projector 100 related to the present embodiment, by decreasing the blind area caused in the projection image G, it is possible to display an image excellent in sound quality and image quality.

In the present embodiment, the projection optical unit section 102 emits the light L so that the light flux L1 at the first holding part 111 side in the height direction D1 proceeds toward the optical axis AX.

According to this configuration, by the light flux L1 proceeding toward the optical axis AX, it is possible to make the lower end G1 of the projection image G be located at the upper side of the lower end 6a of the projection lens 6. Therefore, it is possible to project the projection image G on the screen SCR in the state of being shifted upward as described above.

In the present embodiment, the second holding part 112 has the plurality of side plates 130 disposed so as to surround the periphery of the speaker section 103, and each of the side plates 130 is provided with the openings 130a.

According to this configuration, the sound in the low-tone range low in directionality emitted from the speaker section 103 can be emitted toward the all directions of the projector 100. Thus, it is possible to allow the user to hear the surround sound.

In the present embodiment, the second holding part 112 has the cover member 140 for covering the plurality of side plates 130.

According to this configuration, it is possible to make it difficult for the openings 130a provided to the side plates 130 to visually be recognized from outside using the cover member 140. Therefore, it is possible to improve the appearance property of the second holding part 112.

In the present embodiment, the surfaces 130b covered with the cover member 140 of the plurality of side plates 130 are each provided with the antireflection treatment.

According to this configuration, since the reflection of the outside light by the surfaces 130b of the side plates 130 is suppressed, it is possible to make it difficult for the openings 130a of the side plates 130 to be seen through the cover member 140. Therefore, it is possible to further improve the appearance property of the second holding part 112.

In the chassis 101 in the present embodiment, the first holding part 111 and the second holding part 112 are formed of the discrete bodies, and the fixation structure section 115 for fixing the first holding part 111 and the second holding part 112 is disposed inside the chassis 101.

According to this configuration, since the screw members constituting the fixation structure section 115 are not exposed to the exterior part of the chassis 101, it is possible to improve the appearance property of the projector 100.

In the present embodiment, the speaker section 103 includes the low-tone range speaker 113 and the middle/high-tone range speaker 123 for emitting the sound in the tone range higher than that of the low-tone range speaker 113, and the middle/high-tone range speaker 123 is disposed inside the second holding part 112 so as to face to the opposite side to the light emission direction (the second direction) D2 of the projection optical unit section 102.

According to this configuration, it is possible to actively allow the user to hear the sound S1 in the middle/high-tone range high in directivity emitted from the middle/high-tone range speaker 123.

In the present embodiment, the first holding part 111 has the bottom plate 120, and the plurality of leg parts 121 provided to the bottom plate 120, and the first leg part 121a located at the projection lens 6 side out of the plurality of leg parts 121 can be adjusted in the amount of projection from the bottom plate 120.

According to this configuration, it is possible to move the direction of the light emitted from the projection lens 6 obliquely upward with respect to the installation surface M. Thus, it is possible to project the projection image G on the screen SCR in the state of being further shifted to the upper side in the height direction D1. Therefore, it is possible to further decrease the blind area caused in the projection image G.

It should be noted that the scope of the present disclosure is not limited to the embodiment described above, but a variety of modifications can be provided thereto within the scope or the spirit of the present disclosure.

For example, in the embodiment described above, there is cited when the light L emitted from the projection lens 6 is different in the divergence angle with respect to the optical axis AX of the projection lens 6 in the height direction D1 as an example, but the divergence angles with respect to the optical axis AX in a direction other than the height direction D1 such as the width direction D3 can be different from each other or can also be the same as each other.

Besides the above, the specific descriptions of the shape, the number, the arrangement, the material, and so on of the constituents of the projector are not limited to those of the embodiment described above, but can arbitrarily be modified. Although in the embodiment described above, there is described when the projector according to the present disclosure is applied to the projector using the liquid crystal light valves as an example, this is not a limitation. The projector according to the present disclosure can also be applied to a configuration using digital micromirror devices as the light modulation devices. Further, the projector is not required to have a plurality of light modulation devices, and can be provided with just one light modulation device. In the embodiment described above, the light emission direction D2 is a direction along the optical axis AX of the projection lens 6, but this is not a limitation, and the light emission direction D2 and the direction of the optical axis AX can be different from each other.

A projector according to an aspect of the present disclosure may have the following configuration.

A projector according to an aspect of the present disclosure includes a projection optical unit section including a projection lens, a speaker section, and a chassis having a first holding part configured to hold the projection optical unit section, and a second holding part which is stacked along a first direction with respect to the first holding part, and is configured to hold the speaker section, wherein light emitted from the projection lens spreads toward a second direction perpendicular to the first direction in a plane including the first direction and an optical axis of the projection lens, and in the light emitted from the projection lens, a divergence angle at an opposite side to the first direction with respect to the second direction is smaller than a divergence angle at the first direction side with respect to the second direction.

In the projector according to the above aspect of the present disclosure, there may be adopted a configuration in which the projection optical unit section emits the light so that a light flux at the opposite side to the first direction out of the light emitted from the projection lens proceeds toward the optical axis.

In the projector according to the above aspect of the present disclosure, there may be adopted a configuration in which the second holding part has a plurality of side plates disposed so as to surround a periphery of the speaker section, and the side plates are each provided with an opening.

In the projector according to the above aspect of the present disclosure, there may be adopted a configuration in which the second holding part has a cover member configured to cover the plurality of side plates.

In the projector according to the above aspect of the present disclosure, there may be adopted a configuration in which surfaces covered with the cover member of the plurality of side plates are each provided with an antireflection treatment.

In the projector according to the above aspect of the present disclosure, there may be adopted a configuration in which the first holding part and the second holding part are formed of discrete bodies in the chassis, and a fixation structure section configured to fix the first holding part and the second holding part is disposed inside the chassis.

In the projector according to the above aspect of the present disclosure, there may be adopted a configuration in which the speaker section includes a first speaker, and a second speaker configured to emit a sound in a tone range higher than a tone range of the first speaker, and the second speaker is disposed inside the second holding part so as to face to an opposite direction to a light emission direction of the projection optical unit section.

In the projector according to the above aspect of the present disclosure, there may be adopted a configuration in which the first holding part has a bottom plate, and a plurality of leg parts provided to the bottom plate, and one of the leg parts located at the projection lens side is adjustable in an amount of projection from the bottom plate.

In the projector according to the above aspect of the present disclosure, there may be adopted a configuration in which there are included a light source device, a light modulation device configured to modulate light emitted by the light source device, and a cooling section configured to supply a cooling medium to the light source and the light modulation device, wherein the first speaker has a first vibrating plate vibrating along the first direction, and the first vibrating plate is disposed so as to at least partially overlap the cooling section in a plan view from the first direction.

In the projector according to the above aspect of the present disclosure, there may be adopted a configuration in which there are included a light source device, and a light modulation device configured to modulate light emitted by the light source device, wherein the second speaker has a second vibrating plate vibrating along a direction crossing the first direction, and the second vibrating plate is disposed at a position where the second vibrating plate fails to overlap the light modulation device in a plan view from the first direction.

What is claimed is:
1. A projector comprising:
a projection optical unit section including a projection lens;
a speaker section; and
a chassis having a first holding part configured to hold the projection optical unit section, and a second holding part which is stacked along a first direction with respect to the first holding part, and is configured to hold the speaker section, wherein light emitted from the projection lens spreads toward a second direction perpendicular to the first direction in a plane including the first direction and an optical axis of the projection lens, and in the light emitted from the projection lens, a divergence angle at an opposite side to the first direction with respect to the second direction is smaller than a divergence angle at the first direction side with respect to the second direction.

2. The projector according to claim 1, wherein the projection optical unit section emits the light so that a light flux at the opposite side to the first direction out of the light emitted from the projection lens proceeds toward the optical axis.

3. The projector according to claim 1, wherein the second holding part has a plurality of side plates disposed so as to surround a periphery of the speaker section, and the side plates are each provided with an opening.

4. The projector according to claim 3, wherein the second holding part has a cover member configured to cover the plurality of side plates.

5. The projector according to claim 4, wherein surfaces covered with the cover member of the plurality of side plates are each provided with an antireflection treatment.

6. The projector according to claim 1, wherein the first holding part and the second holding part are formed of discrete bodies in the chassis, and a fixation structure section configured to fix the first holding part and the second holding part is disposed inside the chassis.

7. The projector according to claim 1, wherein the speaker section includes a first speaker, and a second speaker configured to emit a sound in a tone range higher than a tone range of the first speaker, and the second speaker is disposed inside the second holding part so as to face to an opposite direction to a light emission direction of the projection optical unit section.

8. The projector according to claim 1, wherein the first holding part has a bottom plate, and a plurality of leg parts provided to the bottom plate, and one of the leg parts located at the projection lens side is adjustable in an amount of projection from the bottom plate.

9. The projector according to claim 1, further comprising:
a light source device;
a light modulation device configured to modulate light emitted by the light source device; and
a cooling section configured to supply a cooling medium to the light source device and the light modulation device, wherein the first speaker has a first vibrating plate vibrating along the first direction, and the first vibrating plate is disposed so as to at least partially overlap the cooling section in a plan view from the first direction.

10. The projector according to claim 1, further comprising:
a light source device; and
a light modulation device configured to modulate light emitted by the light source device, wherein the second speaker has a second vibrating plate vibrating along a direction crossing the first direction, and the second vibrating plate is disposed at a position where the second vibrating plate fails to overlap the light modulation device in a plan view from the first direction.

* * * * *